United States Patent [19]

Walsh et al.

[11] Patent Number: 4,716,478
[45] Date of Patent: Dec. 29, 1987

[54] TWO POINT ATTACHMENT WITH SINGLE POINT CLAMPING FOR CONNECTING THE ARM STACK TO THE ACTUATOR MEMBER IN A DISC MEMORY DRIVE

[75] Inventors: Edward Walsh; David W. Woito, both of Boise, Id.

[73] Assignee: Hewlett-Packard Company, Palo Alto, Calif.

[21] Appl. No.: 829,688

[22] Filed: Feb. 14, 1986

[51] Int. Cl.$^4$ .................... G11B 21/08; G11B 21/24; G11B 21/16

[52] U.S. Cl. .................... 360/104; 360/106; 360/109

[58] Field of Search .................... 360/106, 104, 109

[56] References Cited

U.S. PATENT DOCUMENTS

| 4,331,991 | 5/1982 | Morehouse et al. | 360/106 |
| 4,346,416 | 8/1982 | Riggle et al. | 360/106 |

FOREIGN PATENT DOCUMENTS 55-70971   5/1980   Japan .................... 360/106

Primary Examiner—Robert S. Tupper
Attorney, Agent, or Firm—William J. Bethurum

[57] ABSTRACT

An actuator arm assembly for a rotary disc memory drive which comprises a pivotally mounted actuator member and an arm stack unit mounting individual transducer head flexure assemblies. The armstack unit is connected to the actuator member at two locations and requires clamping only at one of the two locations to secure the connection at both locations. The armstack and transducer head flexure assemblies are removable as a unit by unclamping the armstack at that one location, effecting release at both locations, permitting armstack removal as an aligned assembly unit including the transducer head flexure assemblies, circuits and electrical connectors.

13 Claims, 11 Drawing Figures

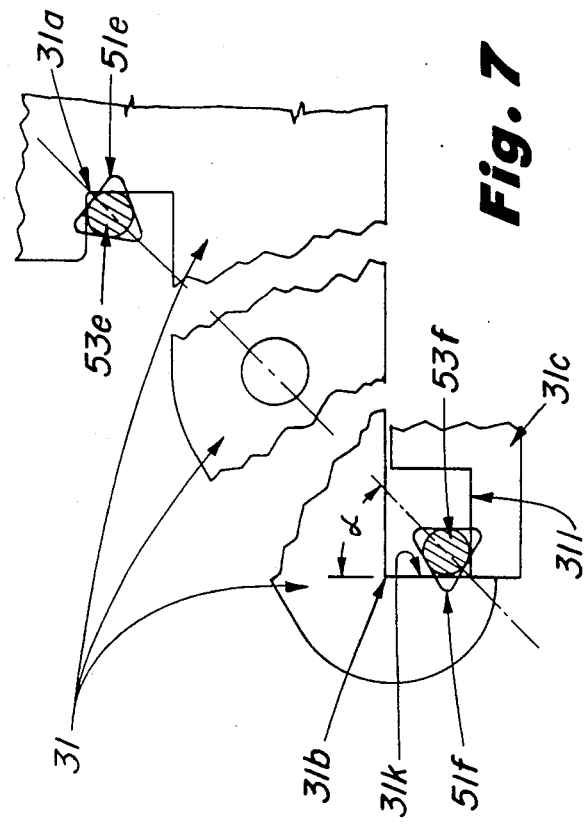
Fig. 7
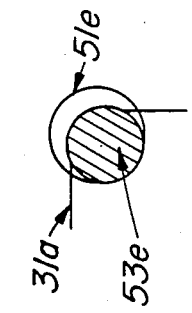
Fig. 10
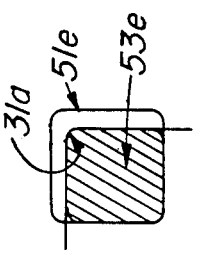
Fig. 9
Fig. 8

TWO POINT ATTACHMENT WITH SINGLE POINT CLAMPING FOR CONNECTING THE ARM STACK TO THE ACTUATOR MEMBER IN A DISC MEMORY DRIVE

TECHNICAL FIELD

This invention relates generally to rotary disk memory drives and more particularly to an arrangement in such drives for detachably securing, as an assembled unit, an arm stack structure, including transducer heads and related electronics, to an actuator member which is pivotally mounted to move said transducer heads bidirectionally in an arcuate path over the surface of said discs.

BACKGROUND ART

Computer disk drives are dynamic magnetic storage units having high bit densities. They are very high precision units requiring close dimensional tolerances in manufacturing and are complex and delicate mechanically. They generally comprise rotatable memory discs, transducer heads, and in one type, a pivotally mounted magnetically driven actuator arm assembly supporting the transducer heads for bidirectional arcuate movement over the discs.

Prior art disc drives of the pivoting type have been difficult to assemble and to disassemble. Frequently the transducer heads and supporting arms are part of an integral pivotally mounted actuator arm assembly which includes the lubricated bearing structure. Removal of this assembly for testing or replacement of heads involves a major disassembly of the structure. In other arrangements the arms which carry the transducer heads may be removable individually from a pivotally mounted actuator member, but the electrical connections must be detached at the transducer head wires while in proximity to the rest of the structure which is difficult and the arms and heads can not be tested as a unit until after complete reassembly of the structure. Mechanical tolerances in a drive with a large number of discs can be difficult to deal with, particularly with respect to relative heights of the discs and arms.

In other instances where the designs provide for detachment of the arms which support the heads individually, shims are used to achieve the center-to-center spacing of the arms and heads to correspond with the axial center-to-center spacing of the discs. In still other instances, the arms are attached and adjusted individually using a beveled drive bolt. This is a technique that requires precise control of bolt torque and which is very time consuming when there are a large number of discs and heads.

DISCLOSURE OF THE INVENTION

This invention provides improvements over the prior art as presently known in the provision of an actuator arm assembly comprising a pivotally mounted actuator member and an arm stack unit to which the transducer heads are attached. The arm stack unit comprises a plurality of individual arms having pads which are precision machined to provide precise arm thickness. These identical arms are bolted together in a stack in which the arms have center-to-center spacings corresponding closely to the center-to-center axial spacing of the planes of the discs. Individual transducer flexure assemblies are mounted on the ends of the arms by means of screws, the flexures providing the required spring loading of the transducers in their "flight" over the discs on the thin film of air clinging to the disc surfaces and moving therewith as the discs spin. Spin rates are about 3600 revolutions per minute and transducer head spacing above the disc surface in flight may be 19 one millionths of an inch or less. The requirement for high precision is evident, and hand connection and adjustment of individual electrical leads, arms and transducers among a plurality of discs, is not a viable manufacturing or reassembly technique.

The arm stack unit of this invention comprises arms which are precision machined, assembled once and which remain assembled except for individual head replacement. The transducer head flexure assemblies are attached to the individual arms with screws and their circuit wires are attached to the arms. A flat, flexible circuit, having individual circuit traces, and amplifying electronics has a pad at one end mounted on the armstack at which individual head wires are connected to the individual circuit traces. The flexible circuit terminates in a detachable multipin plug connector at its other end and remains with the arm stack unit when the arm stack is removed from the actuator member.

The arm stack unit is detachably connected to the pivotally mounted actuator member in two locations and requires clamping at only one location to secure the arm stack at both locations. When connected to the actuator member, the arm stack positions the individual transducers over the respective disc surfaces in corresponding radial positions from the pivot axis of the actuator member and in corresponding positions radially of the discs providing bidirectional arcuate travel of the transducer heads over the discs between radial positions near the outer edge of the discs and toward the center of the discs.

With this arrangement, the actuator member may be built and tested as a separate unit. The actuator member structure separately mounts a magnetic driver which has permanent magnets and a moveable coil assembly connected to the actuator member. This assembly is now testable as to magnetic properties, torque/current relationships, etc., in a location removed from the armstack unit. Damages to the magnetic heads either mechanically, electrically or magnetically during such testing, common in the integrated arrangements of the prior art, are now obviated.

BRIEF DESCRIPTION OF DRAWINGS

FIG. 7 is an enlarged fragmentary view illustrating the arrangement for attaching the arm stack unit to the actuator member; and FIGS. 8, 9 and 10 illustrate detail modifications of the structure of FIG. 7.

BEST MODES FOR CARRYING OUT THE INVENTION

Figure 1:
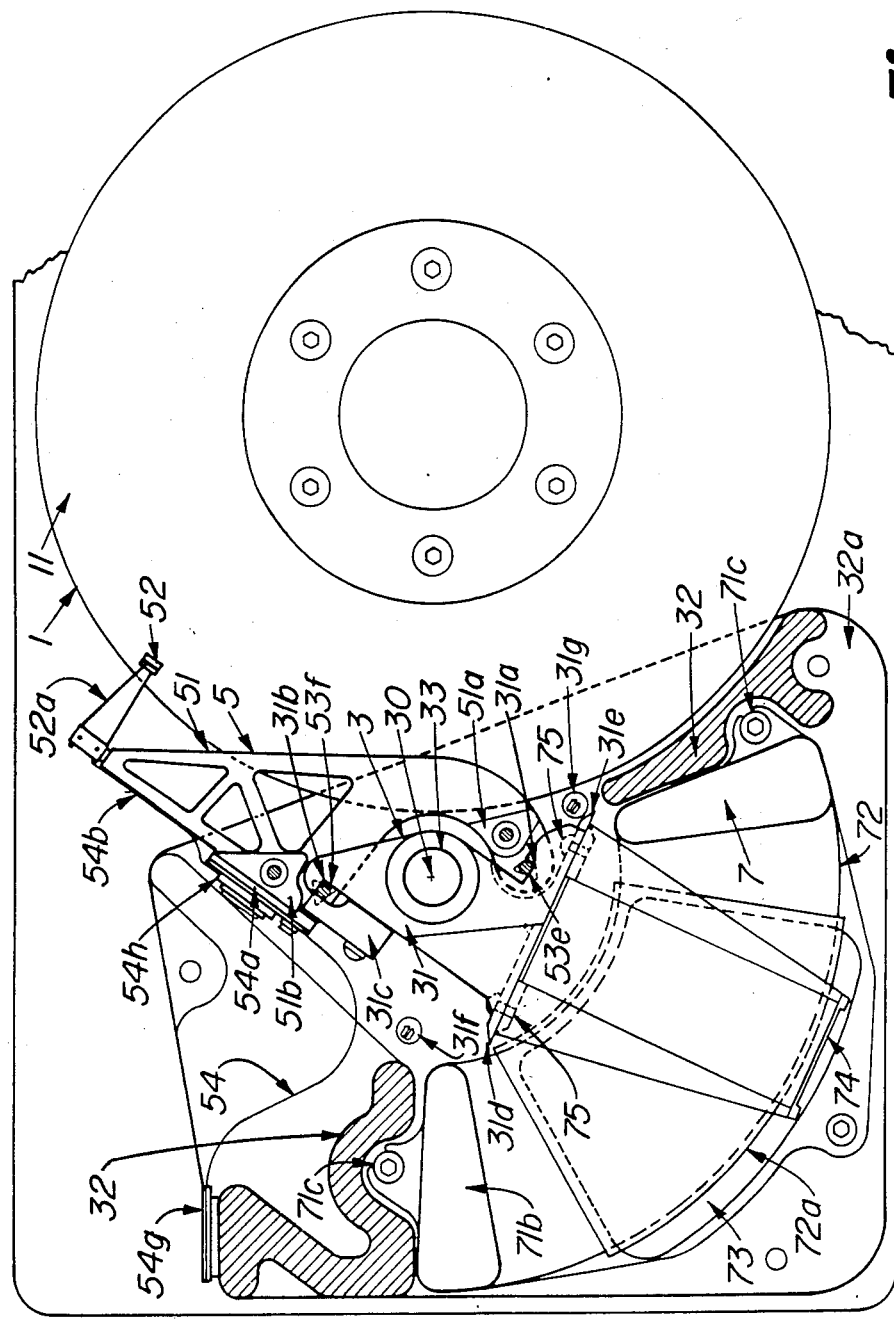
FIG. 1 is a plan view, partly in section of a disc memory drive assembly embodying the principles of this invention.
Figure 2:
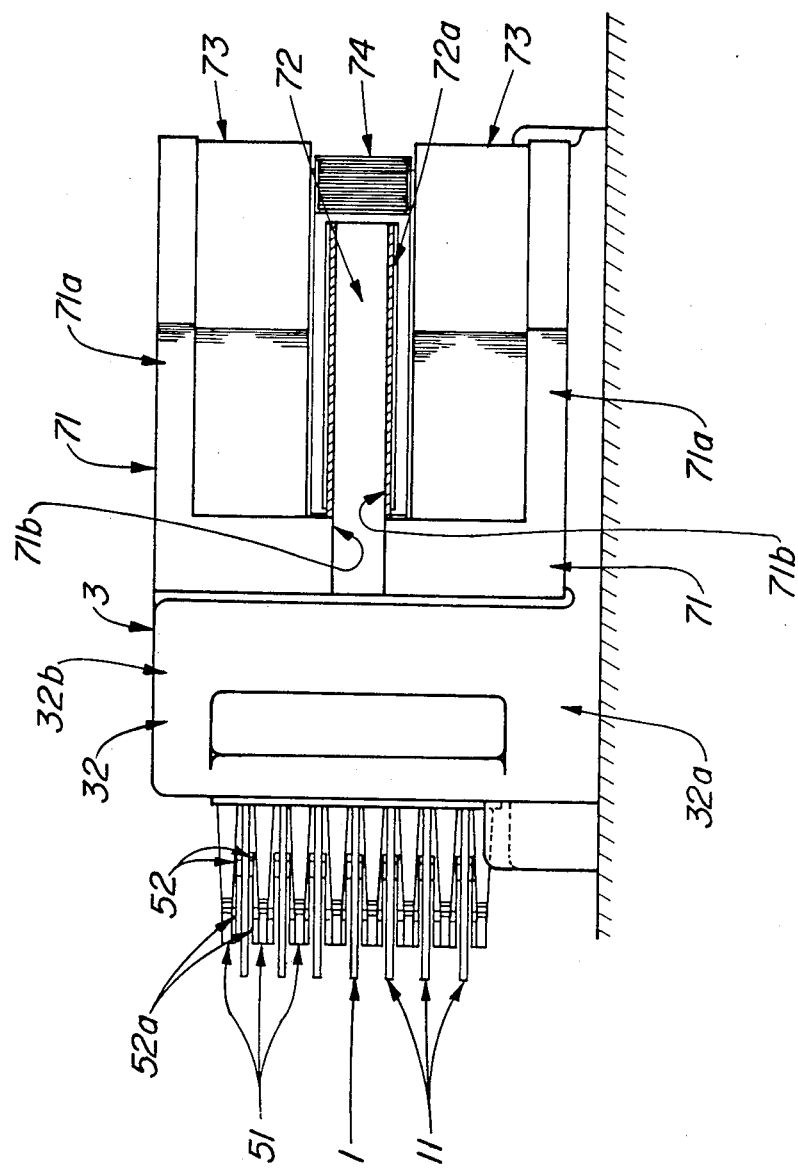
FIG. 2 is a side view, partly in section of the disc drive assembly of FIG. 1.

This improved actuator arm structure is utilized in a rotary disc memory drive. FIGS. 1 through 7 illustrate the details of a presently preferred embodiment of this invention. A disc memory drive as seen in FIGS. 1 and 2, typically comprises a magnetic disc assembly 1 adapted to be driven by a motor (not shown). Normally such a magnetic disc assembly will be driven at about 3600 revolutions per minute at constant speed. The improved actuator arm structure comprises an actuator structure subassembly 3, and arm stack subassembly 5 and a magnetic driver subassembly 7.

Figure 3:
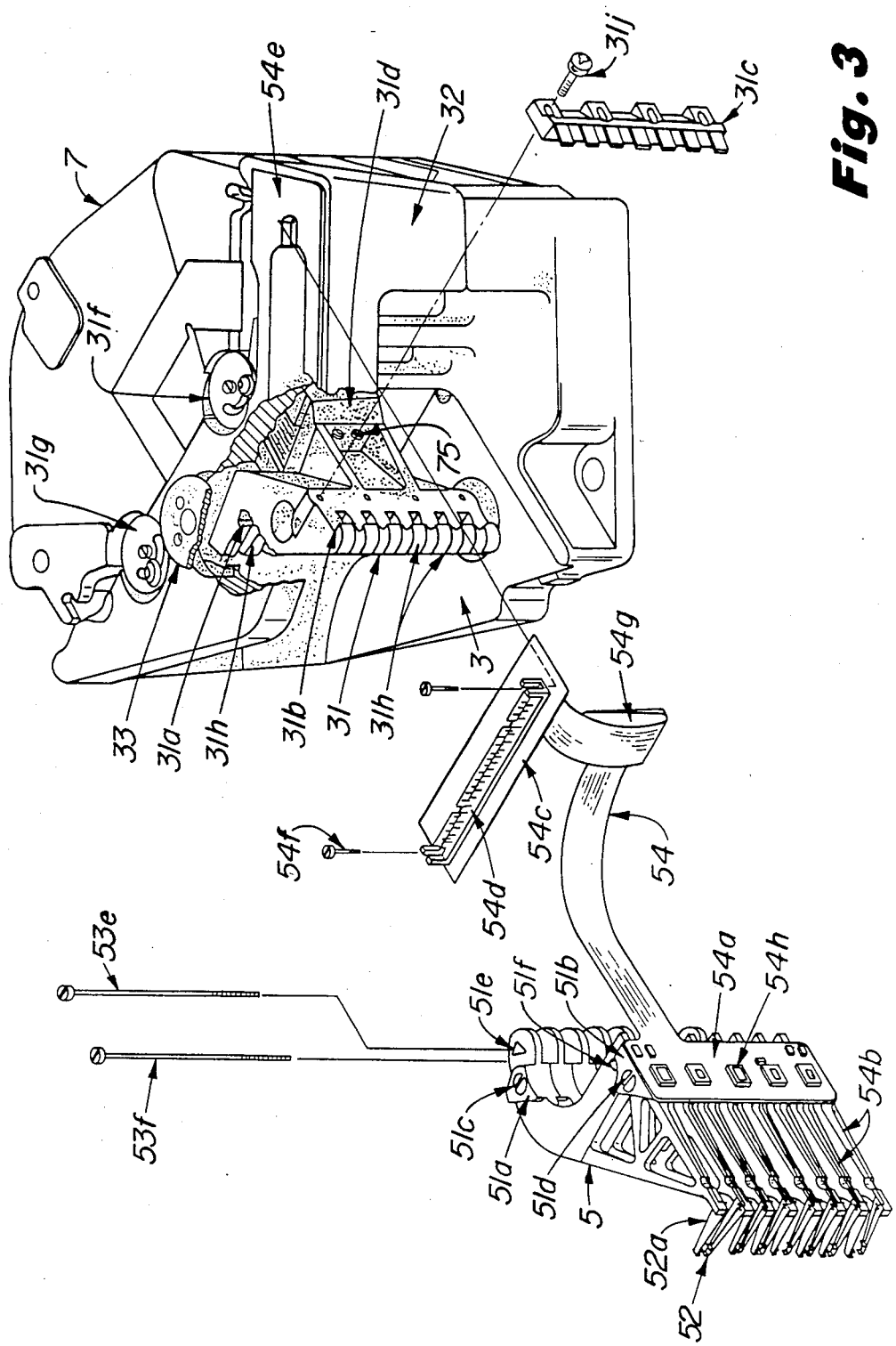
FIG. 3 is an exploded perspective view illustrating additional details of this invention.

As viewed in FIGS. 1 and 3, one or two head assemblies 52a are attached to the outer extremety of each arm 51 of the arm stack assembly in a position projecting towards each of the discs 11. The actuator arm assembly is in an angular position about the axis, 30 as seen in FIG. 1, positioning the magnetic heads 52 in their extreme outer positions on the magnetic disc. The arm stack unit 5 is attached to the actuator member 31 at two positions 53e and 53f. This specific fastening means will be described hereinafter.

The magnetic driver subassembly 7 is a permanent magnet structure having a coil assembly 74 secured to the actuator member 31 in a position encompassing and sweeping an arcuate center pole 72, forming part of the magnetic driver subassembly 7. Current of reversible polarity, when applied to the coil 74 produces an electromagnetic field interacting with the permanent magnet fields produced by permanent magnets in the magnetic housing, to produce reversible torques about the axis 30 for moving the magnetic heads 52 bidirectionally in an arcuate path over the discs.

Considering the unique functional subassemblies of the actuator arm structure or assembly in greater detail and beginning with the actuator structure subassembly 3, reference is now made to FIGS. 1 and 3. The actuator member 31 has a vertical dimension which fits between the inner confronting faces of the upper and lower sections of the housing 32. The actuator member 31 is pivoted about a shaft assembly 33 which is journaled by bearings in the openings in the upper and lower sections of the housing 32. The actuator member 31 is a single piece structure of lightweight material such as magnesium and is shaped as viewed from the top as seen in FIGS. 1 and 3 to provide notches 31a and 31b in substantially diametrically opposite positions with respect the axis 30. Flanges 31h in the vicinity of notches 31a and 31b have been formed in the die casting transverse of the axis 30 at these locations. By this expedient 2 rows of aligned notches 31a and 31b are formed in positions paralleling the pivot axis 30.

Figure 4:
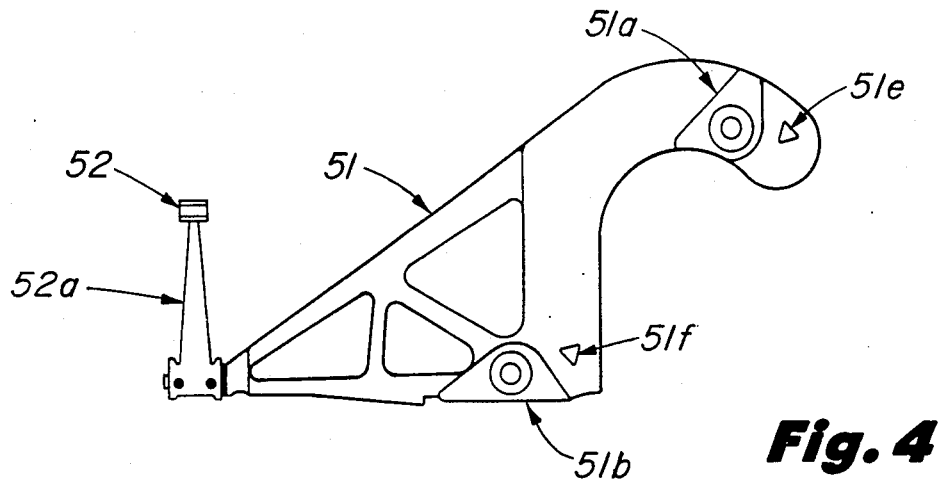
FIG. 4 is a plan view of a presently preferred arm of the arm stack assembly illustrating the triangular openings or holes which form one part of the attachment member.
Figure 4A:
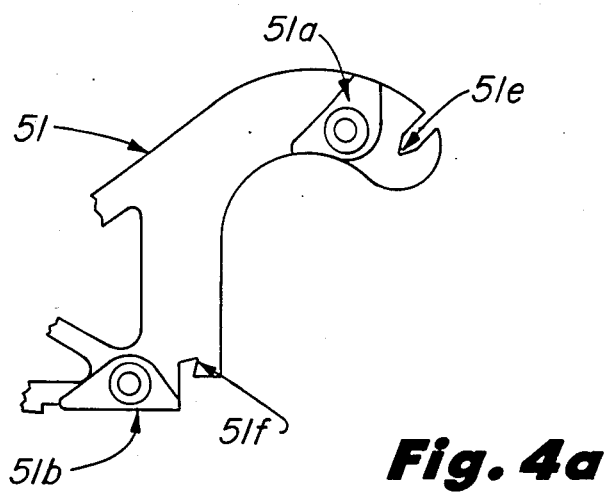
FIG. 4a illustrates an arm in which the openings are modified to open through the edges of the arm.
Figure 5:
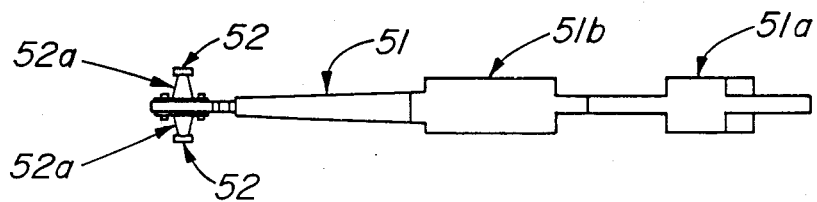
FIG. 5 is an edge view of FIG. 4.
Figure 6:
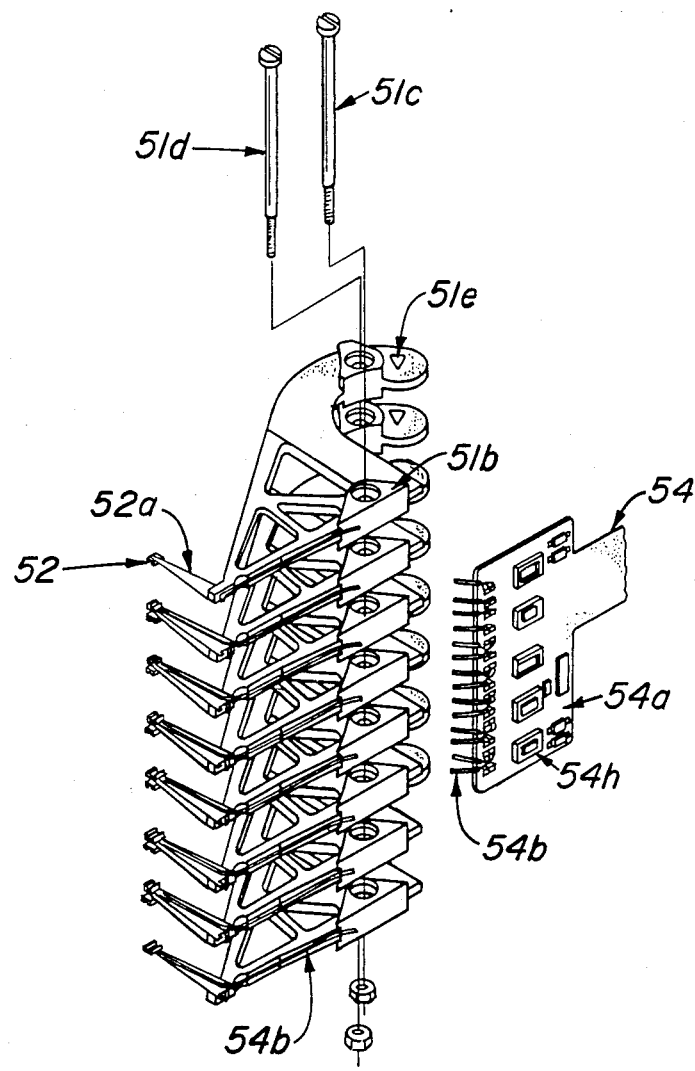
FIG. 6 is an exploded perspective view of the arm stack assembly.

The arm stack subassembly 5 comprises individual arms 51 which are stacked as seen in FIG. 2 and in FIG. 3. One arm 51 and a modification thereof are detailed in the plan views of FIGS. 4 and 4a. FIG. 5 is the edge view of FIG. 4. There are seven discs and eight arms (FIG. 2) which places an arm and a magnetic transducer head on each side of each disc. Each arm is provided with pads 51a and 51b on each side. These are carefully machined to provide the required thicknesses so that the center-to-center distances between the arms of the arm stack correspond to the center-to-center distances between the planes of the discs. The transducer head assemblies are mounted on the arms. The arms are stacked and identically situated holes through the pads are aligned. Bolts 51c and 51d extending through these holes secure the arms in assembled position providing the unitized arm stack 5. Each arm of the arm stack 5 as seen in FIG. 4, is additionally provided with triangular openings or holes defining angles 51e and 51f which define rows of aligned angles in the assembly. The V-shaped openings of FIG. 4a are the functional equivalent of the triangular openings of holes of FIG. 4. Discussions which follow concerning the triangular openings or holes will be understood to apply equally to the V-shaped openings. The triangular openings of FIG. 4 are presently preferred. These angles are oriented to have confronting vertices, that is, each has a vertex pointed towards the other, as best seen in FIGS. 4 and 7. Stated otherwise, the bisectors of these angles 51e and 51f lie substantially along the same line. Individual pins 53e and 53f of circular cross section (see also FIG. 3) fit within the sides of the angles near the vertices. The spacing between the vertices of these angles is such, as seen in FIGS. 1 and 7, that when the arm stack 5 is positioned on the actuator member 31 a circular pin 53e within the angle 51e at the notch 31a will have circumferential portions which are tangent to the 2 sides of the notch 31a and tangent to the two sides of the angle 51e. The circular pin 53f within the sides of the angle 51f at notch face 31k and notch face 31l has a single circumferential portion in contact with but one side or face 31k of the notch 31b. This one side of the notch 31b forms an acute angle (FIG. 7) with a line from the center of the circle or pin at the notch 31a through the center of the circular pin at notch face 31b. Thus, the application of a force to the pin 53f substantially paralleling the notch face 31k, couples a force to the armstack which slightly rotates the arm stack about the pin 53e in the notch 31a which has a force component from pin 53f acting along a line between the centers of the circular pins toward the notch 31a, securely engaging the arm stack between the notches 31a and the notch formed by faces 31k and 31l. It will be appreciated that when the pin 53f is captured within holes in each of the arms of the armstack, that instead of applying the force to the pin 53f, the force may be applied directly to the armstack.

FIG. 7 illustrates the attachment details at an enlarged scale. The actuator member 31 is illustrated in broken outline but only the outline of the triangular holes forming the angles 51e and 51f of the arm stack 51 of FIG. 4 are illustrated. Elimination of the arm stack 5 simplifies the illustration, while clearly demonstrating the principles of the attachment. As described, individual pins 53e and 53f of circular cross section, fit between the sides of the angles 51e and 51f in the individual arms of the arm stack assembly. In attaching the armstack to the actuator member 31, the individual arms of the arm stack are fitted into the slots defined between the flanges 31h of the actuator member 31. One pin 53f moves over the top edge of the notch 31b as the arm stack is moved into position in the slots. Thereafter, the pin 53e at the other end of the arm stack moves into and engages the notch 31a. A clamp 31c (see also FIG. 3), loosely slidably fitted to the actuator member 31 by means of screws 31j is then moved so that individual projections on this clamp fit between the individual arms of the arm stack and bear upon the pin 53 at the notch 31b. The armstack rotates slightly about the pin 53 in the notch 31a as the clamp is tightened. This forces the pin 53f downwardly against the abutting face 31k in the notch 31b forcing the pin 53f against the two sides of the angle 51f. This moves the entire arm stack assembly 5 in a direction which forces the other pin 53e into engagement with the two sides of the notch 31a and into engagement with the two sides of the angle 51e. This rigidly secures the arm stack to the actuator member 31.

As an alternative, when the arm stack is assembled and positioned on the actuator member 31, clamping pressure may be applied by the clamp 31c to provide forces and bearing stresses between the pin, the arm stack and the actuator member resulting in stresses exceeding the yield strengths of the softer materials. Thus the faces of the angles and the faces of the notches in the softer materials engaged by the pins 53e and 53f are dimpled or depressed due to plastic deformation which firmly seats the pins in the depressions. Thereafter, the clamp 31c is loosened sufficiently so that the materials may operate in their elastic stress range. This approach increases the area of the bearing surfaces which distributes and reduces the bearing loads where the parts are in contact. This in turn reduces the likelihood of minute displacements occurring should the actuator member impact its limit stops, for example.

In this attachment of the arm stack to the actuator member, provision has been made for providing a positive and precise alignment of the arm stack with respect to the actuator member 31, and the magnetic disc assembly 1. At the same time, there is provided an easily accessable and actuatable fastening means for detaching and reinstalling the arm stack in the actuator system.

As seen in FIG. 1, the screws 31j which secure the clamp 31c to the actuator member 31, are located in positions which are clear of the actuator structure housing 32. In this position, a tool may easily engage the heads of the screws so that they may be tightened or released. Attachment of the arm stack assembly to the actuator member 31 is very simple as described hereinabove. Detachment of the arm stack assembly is equally simple requiring only that the screws 31j be loosened to loosen the clamp 31c sufficiently that the pin 53f in the notch 31b can be moved in a direction to clear the end of the notch at which time the entire arm stack assembly can be removed from the actuator member 31.

As seen in FIGS. 1 and 3, a flat flexible circuit 54 having individual circuit traces for each head 52 of the arm stack assembly, has a pad 54a at one end secured to the arm stack 5 on the surface formed by the edges of the individual pads 51b. Conveniently this may be an adhesive, or screw type of attachment. Individual wires 54b connect the individual heads 52 to the individual circuit traces of the flexible circuit 54 in the circuit pad 54a. The other end of the flexible circuit 54 terminates in a multi-pin connector 54d mounted upon a pad 54c. When the arm stack 5 is mounted on the actuator member 32, the pad 54c seats upon a surface 54e on the actuator housing 32. In this position screws 54f secure the connector 54d to the actuator structure housing 32. A pad 54g on the flexible circuit 54 ahead of the connector 54d is used to clamp or adhesively bond the flexible circuit 54 to the forward face of the actuator structure housing 32, or to an additional removable piece mounted there, relieving that end of the flexible circuit 54 coupled to the multipin connector 54d of stresses which might damage the electrical connections therein.

This expedient permits removal of the arm stack assembly 5 from the actuator member 31, while also permitting removal therewith of the electrical circuits including the multipin connector 54d with the arm stack assembly 5. Thus none of the delicate electrical connections to the magnetic heads 52 are disturbed. Equally importantly, the entire arm stack assembly, complete with the electrical circuits, is readily testable by the simple expedient of plugging the electrical connector into the testing unit.

The actuator member 31 now remains journaled in the actuator housing 32 as a part of the actuator structure 33. All arm stack mechanical and magnetic head servicing and testing operations may now be carried on in an environment suited for such activities removed from the actuator structure 3. Likewise, the magnetic driver as a unit with the actuator structure may now be tested separately in an environment removed from the magnetic heads so that mechanical, electrical or magnetic damage which may result from magnetic driver testing with heads attached is obviated.

Other embodiments of this invention are illustrated in FIGS. 8, 9 and 10. These illustrations are fragmentary and include only those aspects of the structure which are necessary in demonstrating the principle being considered.

FIG. 8 illustrates the use of square holes in the individual arms 51. Here, only the hole 51e is illustrated to demonstrate the principle. Notch 31e is shown only as an angle. A pin 53e of octagonal cross section is loosely fitted in the hole 51e. Diametrically disposed flat sides of this pin engage one side of the square hole 51e and a side of the notch 31a. This increases the area of the bearing surfaces which for given applied forces reduces the stresses in the materials at the points of engagement.

These stresses may be further reduced as seen in FIG. 8 by using a square pin 53e providing increased areas of the bearing surfaces.

Although square holes have been illustrated, it is apparent that holes, openings, and notches, and pins, of any cross sectional configuration, having parallel sides are functionally equivalent.

FIG. 10 illustrates a different approach employing the use of circular holes or openings 51e in the individual arms of the arm stack together with a notch having an arcuate junction between the two sides of the notch. Here again, a pin 53e of circular cross section is loosely fitted through the hole 51e. The pin 53e is of a much harder material than either of the materials of the actuator member 31 or the individual arms 51 of the arm stack. When the arm stack is assembled and positioned on the actuator member 31, clamping pressure is applied by the clamp 31c to provide forces and bearing stresses between the pin, the arm stack and the actuator member resulting in stresses exceeding the yield strengths of the softer materials. Thus the surfaces in the softer materials engaged by the pin 53e are dimpled, or depressed, due to plastic deformation which firmly seats the pins in the depressions. Thereafter, the clamp 31c is loosened sufficiently so that the materials may operate in their elastic stress range. Thus the arcuate notch and circular opening configuration provides a viable approach to achieving a rigid attachment since the depressions formed by the pins prevent the pins 53e and 53f from rolling in the notch or in the openings or holes under normal operating conditions of the actuator member. This clamping technique is useful in any assembly where a hard round pin is used in conjunction with softer materials in the actuator member and the arms of the arm stack, regardless of the configuration of the holes, slots, notches or pins.

The slots formed between the flanges 31h of the actuator member 31 are wider than the thickness of the individual arms 51 of the armstack to permit shifting of the armstack axially relative to the actuator member. The purpose of this is to permit axial displacement of the armstack and transducer heads relative to the memory discs to precisely space the heads from the surfaces of the discs. Recalling that the center-to-center spacing of the individual arms of the armstack corresponds within dimensional tolerance limits, if not exactly, to the center-to-center spacing of the planes of the memory discs, the transducer heads are also jigged and precisely spaced with respect to the individual arms and with respect to one another to define a column of aligned heads spaced to match the disc spacing.

When the armstack assembly is joined to the pivotally mounted actuator member, ideally only a simple adjustment of the armstack axially relative to the actuator member precisely positions the individual transducer heads in relation to the confronting disc surfaces and with the heads positioned in vertical alignment over corresponding tracks on the respective discs. Axial adjustment is achieved by actuation of the clamp 31c to establish secure seating of all attachment members. Thereafter the clamp is loosened sufficiently to permit axial adjustments to be made. When adjustments are completed the clamp 31c is secured.

INDUSTRIAL APPLICABILITY

Computer disc memory drives or files, as they are known, are widely used in computers and digital communication systems for storing information useful in performing arithmetic operations or data processing functions. Such equipment is extremely expensive and is difficult to manufacture. This invention in its unique organization simplifies manufacturing and assembly while providing improvements in reliability, reducing both manufacturing costs and maintenance efforts.

I claim:

1. In a disc drive assembly having rotatable memory discs and transducer heads for deriving information from said discs, means for supporting and moving said transducer heads over said discs, comprising:
   a. an actuator structure having a pivotally mounted actuator member, said transducer member having two spaced attachment supports;
   b. an armstack unit comprising individual arms mounting at least one transducer head thereon at one end and having center-to-center arm spacings corresponding to the center-to-center axial spacings of said discs;
   c. two attachment members on said armstack unit adjacent the end thereof opposite said transducer heads and space to engage said attachment supports on said actuator member;
   d. one of said attachment supports comprising a notch and the other of said attachment supports having a face portion disposed at an acute angle to a line from said notch which intersects said face portion, one of said attachment members engaging said notch and the other of said attachment members engaging said face portion; and
   e. means engaging and applying a force to said other of said attachment members acting in a direction substantially paralleling said face portion to securely engage said one attachment member in said notch and to securely engage said other of attachment members with said face portion.

2. The invention according to claim 1, wherein
   a. said attachment members each comprise attachments at each arm of said armstack unit;

3. The invention according to claim 1, wherein
   a. said actuator member has flanges defining axially spaced slots in the region of each attachment support for receiving individual arms of said arm stack;
   b. one of said attachment supports comprises an axially aligned row of notches in said flanges;
   c. the other of said attachment supports comprises an axially aligned row of faces in said flanges;
   d. each arm of said arm stack has two openings therein which are spaced in correspondence with the spacing between said axially aligned row of notches and said axially aligned row of faces, defining respective rows of openings in said armstack;
   e. a pin fitted through each row of openings, one pin engaging each notch of said aligned row of notches and the other pin engaging each face of said aligned row of faces; and
   f. means engaging said other pin for applying a biasing force to said other pin in a direction substantially paralleling said aligned row of faces to securely engage said one pin in said aligned row of notches and to securely engage said other pin with said aligned row of faces.

4. The invention according to claim 3, wherein:
   a. said two openings each have two sides converging in a vertex pointed at the vertex of the other of said two openings.

5. The invention according to claim 3, wherein
   a. said openings are holes having at least four sides and said pins have flat surfaces at least two of which parallel confronting surfaces of the holes.

6. The invention of claim 3, wherein
   a. each of said slots has a width greater than the the thickness of the arm received therein, permitting adjustment of said armstack unit axially relative to said actuator member to properly position said transducer heads relative to the surfaces of said discs;
   b. said means engaging said other pin is adjustable and is first adjusted to apply a force to said other pin sufficient to first secure said armstack unit on said actuator member and then adjusted to permit sliding movement of said armstack unit along said pins, and after axial placement of said armstack unit on said actuator member, finally adjusted to secure said armstack stack unit and said actuator member against relative movement.

7. The invention according to claim 3, wherein
   a. said openings are holes and said pins are loosely fitted through said holes.

8. The invention according to claim 7, wherein
   a. said holes are each substantially triangular in shape.

9. The invention according to claim 8, wherein
   a. said pins are circular in cross-section.

10. The invention according to claim 8, wherein
    a. each triangular hole in each arm has a vertex pointed at the vertex of the other triangular hole.

11. The invention according to claim 7, wherein a. said holes are circular holes and said pins are circular in cross section and of lesser diameter than said holes;
b. said pins being of a harder material than the material of said arms; and
c. said biasing force is sufficient to cause said material of said arms to yield forming depressions in the material of said arms contoured around said pins, whereafter said biasing force is reduced so that said material of said arms works in an elastic range of stress.

12. The invention according to claim 7, wherein
a. said holes are polygon shaped and said pins are circular in cross section and loosely fit in said polygonal holes.
b. said pins being of a harder material than the material of said arms; and
c. said biasing force is sufficient to cause said material of said arms to yield forming depressions in the material of said arms contoured around said pins, whereafter said biasing force is reduced so that said material of said arms works in an elastic range of stress.

13. The invention according to claim 12, wherein
a. said means engaging said other pin comprises a clamp adjustably secured to said actuator member and having a clamp face engaging said other of said pins to apply said biasing force thereto.

* * * * *